United States Patent
Norihisa et al.

(10) Patent No.: US 9,067,265 B2
(45) Date of Patent: Jun. 30, 2015

(54) CUTTING METHOD

(75) Inventors: Takashi Norihisa, Niwa-Gun (JP);
Fumihiro Itoigawa, Nagoya (JP);
Keiichi Kawata, Kariya (JP);
Kazumasa Ishikawa, Kariya (JP)

(73) Assignees: Okuma Corporation, Niwa-Gun (JP);
National University Corporation Nagoya Institute of Technology, Nagoya-Shi (JP); Aichi-Prefectural Government, Nagoya-Shi (JP)

( * ) Notice: Subject to any disclaimer, the term of this patent is extended or adjusted under 35 U.S.C. 154(b) by 738 days.

(21) Appl. No.: 13/009,943

(22) Filed: Jan. 20, 2011

(65) Prior Publication Data

US 2011/0188958 A1 Aug. 4, 2011

(30) Foreign Application Priority Data

Feb. 3, 2010 (JP) ................................ 2010-022422

(51) Int. Cl.
| | |
|---|---|
| B23B 27/12 | (2006.01) |
| B23C 3/00 | (2006.01) |
| B23C 5/28 | (2006.01) |
| B23Q 11/02 | (2006.01) |
| B23Q 11/10 | (2006.01) |

(52) U.S. Cl.
CPC ....... *B23B 27/12* (2013.01); *Y10T 409/303752* (2015.01); *Y10T 407/1946* (2015.01); *Y10T 409/303808* (2015.01); *B23C 3/00* (2013.01); *B23C 5/28* (2013.01); *B23C 2220/56* (2013.01); *B23Q 11/02* (2013.01); *B23Q 11/10* (2013.01)

(58) Field of Classification Search
CPC ................. Y10T 407/1946; Y10T 407/1948; Y10T 409/303752; Y10T 409/303808; B23C 3/00; B23C 5/28; B23Q 11/10; B23B 27/12
USPC ............................ 407/53, 54; 409/131, 132
See application file for complete search history.

(56) References Cited

U.S. PATENT DOCUMENTS

| | | | |
|---|---|---|---|
| 4,610,581 A * | 9/1986 | Heinlein | 409/132 |
| 6,402,441 B2 * | 6/2002 | Yamashita et al. | 409/132 |
| 7,156,006 B2 | 1/2007 | Hyatt et al. | |
| 2007/0144316 A1 | 6/2007 | Muraki et al. | |

FOREIGN PATENT DOCUMENTS

| | | | | |
|---|---|---|---|---|
| DE | 2937513 A1 * | 4/1981 | | B23B 27/12 |
| JP | 53-048289 A1 | 5/1978 | | |

(Continued)

OTHER PUBLICATIONS

Japanese Office Action (Application No. 2010-022422) dated Oct. 11, 2013.

*Primary Examiner* — Daniel Howell
*Assistant Examiner* — Michael Vitale
(74) *Attorney, Agent, or Firm* — Burr & Brown, PLLC

(57) ABSTRACT

There is provided a cutting method for cutting a work by rotating a rotary tool with a circular cutting edge around an axis while a cutting fluid is supplied thereto. Cutting is performed by means of the rotary tool which is rotated in the same rotational direction as an outflow direction of chips, and the rotary tool is rotated at a rotational speed of the rotary tool at which a circumferential speed of the cutting edge is higher than an outflow speed of the chips. Thus, the area of direct solid contact between the rotary tool and the chips is reduced with the aid of a dynamic pressure effect, and the abrasion of the rotary tool is suppressed.

2 Claims, 7 Drawing Sheets

(56) References Cited

FOREIGN PATENT DOCUMENTS

| JP | 56-045307 | A1 | | 4/1981 | | |
| JP | 08281512 | A | * | 10/1996 | ................ | B23C 3/48 |
| JP | 2007-504011 | A1 | | 3/2007 | | |
| JP | 2007-152480 | A1 | | 6/2007 | | |
| JP | 2010-094792 | A1 | | 4/2010 | | |
| JP | 2010234462 | A | * | 10/2010 | ................ | B23C 5/10 |

* cited by examiner

CUTTING METHOD

CROSS-REFERENCE TO RELATED APPLICATIONS

This application claims the benefit of Japanese Patent Application Number 2010-022422 filed on Feb. 3, 2010, the entirety of which is incorporated by reference.

BACKGROUND OF THE INVENTION

1. Field of the Invention

The present invention relates to a cutting method for cutting a work by rotating a rotary tool with a circular cutting edge around an axis while supplying a cutting fluid thereto.

2. Description of the Related Art

In a compound machine or the like, there is known a method in which a rotary tool such as a circular tip, a drill, an end mill or the like is rotated around an axis, a cutting fluid is supplied thereto, and a work gripped by a main shaft is rotated to perform turning (see Japanese Patent Application Publication No. 2007-152480, Published Japanese Translation of PCT Application No. 2007-504011, Japanese Patent Application Publication No. 53-48289, and the like). This is because it is possible to homogenize the abrasion of the tool and hence prolong the life of the tool by forcibly rotating (positively rotating) the tool in this manner.

Further, as an applied example of a cutting method of a positive rotation type as mentioned above, according to the invention described in Japanese Patent Application Publication No. 56-45307, a lobe or a radial section extending to a cutting edge is provided on a cutting face of a cutting tool, or a cutting tool having no lobe is moved in a reciprocating or eccentric manner, so that a film of oil or a lubricating fluid is formed on interfaces among a cutting zone, the tool, and chips.

Among the aforementioned related arts, the art described in Japanese Patent Application Publication No. 56-45307 is considered to achieve the highest effect of prolonging the life of the tool owing to the formation of the fluid film. This is because the formation of the fluid film between the tool and the chips prevents the tool from adhering to a work and leads to the suppression of abrasion.

However, in the art described in Japanese Patent Application Publication No. 56-45307, the cutting tool has the lobe formed thereon or is moved in a reciprocating or eccentric manner for the purpose of forming the fluid film. Therefore, there arise problems such as a cost rise resulting from the necessity to prepare a special cutting tool, and an extended machining time or a deterioration in machining accuracy caused by the additional movement of the cutting tool.

SUMMARY OF THE INVENTION

It is therefore an object of the present invention to provide a cutting method that can favorably suppress the abrasion of a tool and hence prolong the life of the tool without incurring a cost rise or affecting the machining time or machining accuracy.

In order to achieve the above-stated object, according to a first aspect of the present invention, there is provided a cutting method for cutting a work by rotating a rotary tool with a circular cutting edge around an axis while supplying a cutting fluid thereto, including: performing cutting with the rotary tool rotating in a same rotational direction as an outflow direction of chips and at a rotational speed at which a circumferential speed of the cutting edge is higher than an outflow speed of the chips.

In order to achieve the above-stated object, according to a second aspect of the present invention, there is provided a cutting method for cutting a work by rotating a rotary tool with a circular cutting edge around an axis while supplying a cutting fluid thereto, including: performing cutting with the rotary tool inclined at a predetermined angle with respect to a cutting direction and rotating in a rotational direction opposite to an outflow direction of chips and at a rotational speed at which a ratio Vt/Vw is larger than 1, wherein a cutting speed is represented by Vw and a circumferential speed of the cutting edge is represented by Vt.

In the configuration of the first aspect or the second aspect, according to a third aspect of the present invention, the rotary tool may have a cutting face in which a plurality of grooves arranged in a direction intersecting with a concentric circle of the cutting edge are formed.

According to the first and second aspects of the present invention, the area of direct solid contact between the rotary tool and the chips is reduced with the aid of a dynamic pressure effect. Accordingly, the abrasion of the rotary tool is suppressed, and the life of the tool is expected to be prolonged. In particular, the rotary tool need not be formed in any special shape or moved additionally, and the dynamic pressure effect is achieved merely by setting a machining condition. Therefore, no cost rise is incurred, and besides, the machining time or machining accuracy is not affected.

According to the third aspect of the present invention, a more favorable dynamic pressure effect is achieved through the grooves formed in the cutting face, in addition to the effect achieved by the first and second aspects of the present invention. As a result, the life of the tool is prolonged effectively.

DETAILED DESCRIPTION OF THE INVENTION

The embodiments of the present invention will be described on the basis of the drawings.

First Embodiment

Figure 1A:
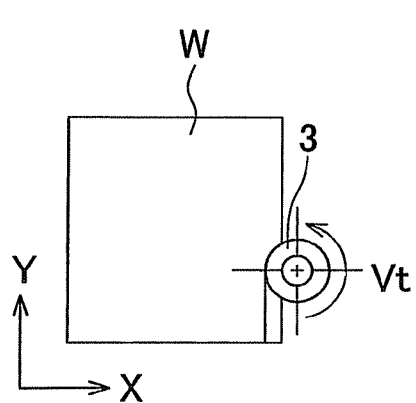
FIGS. 1A to 1C are illustrative views of a cutting method according to the first embodiment of the present invention, FIG. 1A, FIG. 1B, and FIG. 1C being viewed in a Z direction, a Y direction, and an X direction respectively.
Figure 1C:
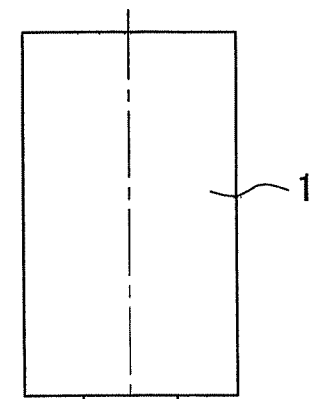
Figure 1B:
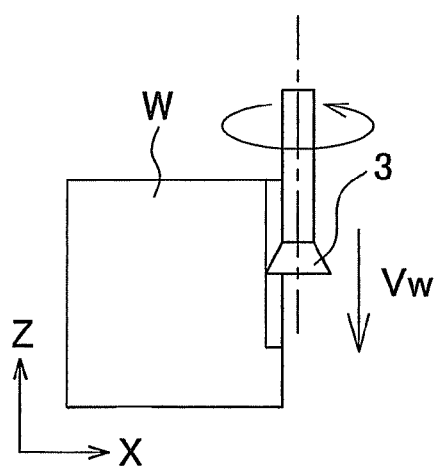
Figure 1B:
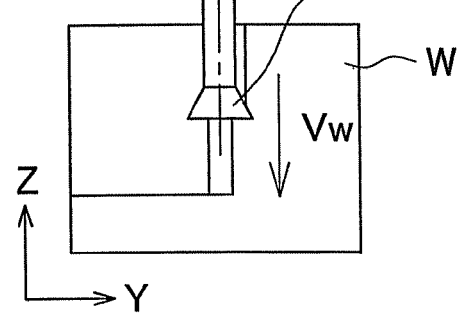

FIGS. 1A to 1C are illustrative views of a tip region of a main shaft of a machining center or the like for carrying out a cutting method according to the present invention. Reference numerals 1 and 2 denote a spindle that rotates by being driven by a motor, and a tool holder, respectively. The tool holder 2 is mounted with a rotary tool 3. In this case, the method is explained with an example of plunge milling in which the rotary tool 3, which has a circular cutting edge 4 (shown in FIG. 2), is moved toward a minus side in a Z direction while being rotated to cut an outer face of a work W to a predetermined depth. After cutting the outer face of the work W, the rotary tool 3 is retreated toward a plus side in the Z direction after the cutting of the work W, and then the rotary tool 3 is moved toward a plus side in a Y direction to cut the work W toward the minus side in the Z direction again. It should be noted that the rotary tool 3 is provided with a device (not shown) for supplying a cutting fluid so that the cutting fluid can be supplied to a gap between the work W and the rotary tool 3.

Figure 2:
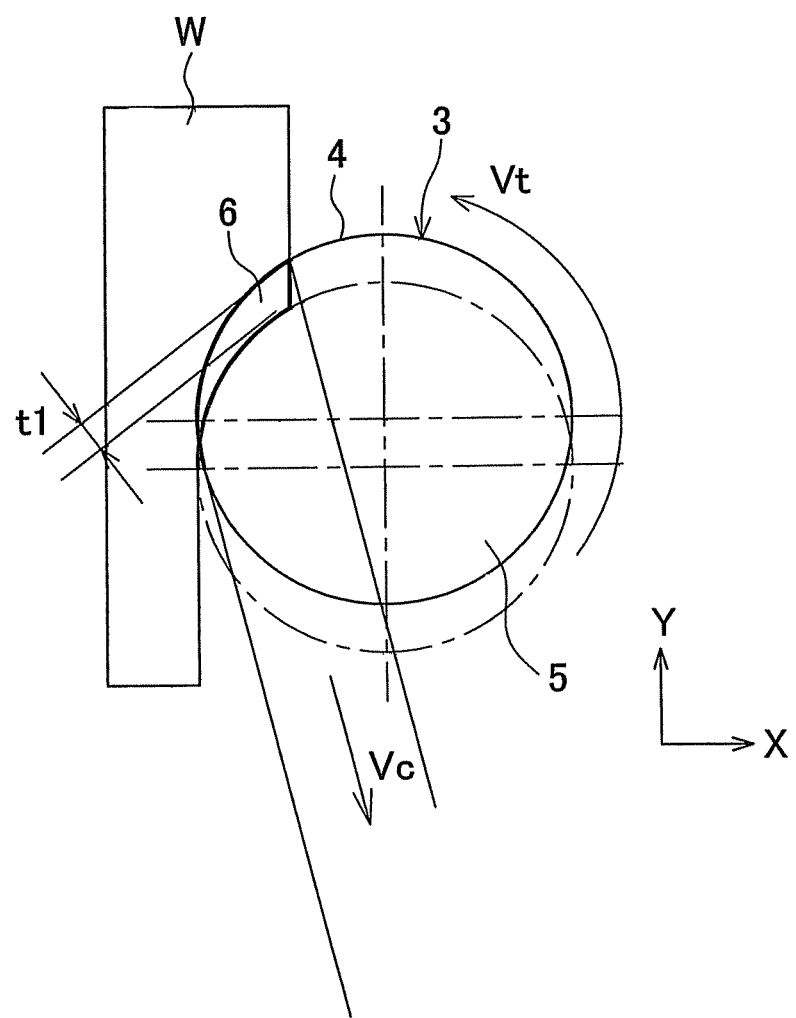
FIG. 2 is an enlarged view of a cutting region according to the first embodiment as viewed in the Z direction.

In this plunge milling, as shown in FIG. 2, chips 6 are subject to receipt of a frictional force due to a cutting face 5 of the rotary tool 3 in a rotational direction thereof. Therefore, the chips 6 flow out in this rotational direction.

In the first embodiment, a film of the cutting fluid is produced between the rotary tool 3 and the chips 6 with the aid of a dynamic pressure effect, thereby preventing solid contact and hence abrasion. The dynamic pressure effect serves to generate a fluid pressure by drawing a fluid into a frictional portion, so that a whole load is supported by the fluid pressure of the cutting fluid instead of being supported by a contact pressure between solid bodies.

However, in order to achieve the dynamic pressure effect in this plunge milling, the circumferential speed of the cutting edge 4 of the rotary tool 3 needs to be higher than the outflow speed of the chips 6.

Figure 3:
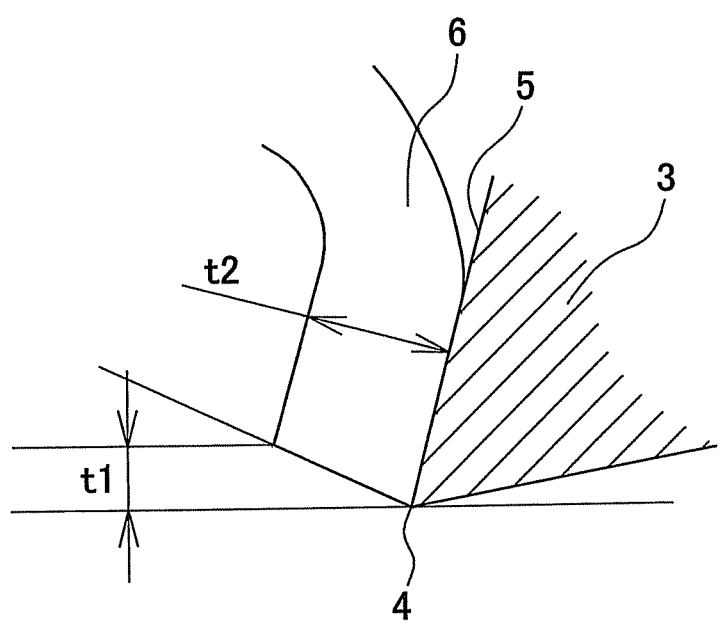
FIG. 3 is an enlarged view of a cutting point according to the first embodiment.

It should be noted herein that an outflow speed Vc of the chips 6 can be obtained from an actual cut amount t1 determined from a machining condition, an actual chip thickness t2 (shown in FIG. 3), and a moving speed (a cutting speed) Vw of the rotary tool 3 toward the minus side in the Z direction, according to an expression shown below.

$$Vc = Vw \times t1/t2$$

Accordingly, it is appropriate to set the machining condition such that a circumferential speed Vt of the cutting edge 4 becomes higher than the outflow speed Vc of the chips 6.

As described above, according to the cutting method of the foregoing first embodiment of the present invention, the rotary tool 3 is rotated in the same rotational direction as the outflow direction of the chips 6 and at a rotational speed such that the circumferential speed of the cutting edge 4 is higher than the outflow speed of the chips 6, to perform cutting. Thus, the area of direct solid contact between the rotary tool 3 and the chips 6 is reduced with the aid of the dynamic pressure effect. Accordingly, the abrasion of the rotary tool 3 is suppressed, and the life of the tool is expected to be prolonged. In particular, the rotary tool 3 need not be formed in any special shape or moved additionally, and the dynamic pressure effect is achieved merely by setting the machining condition. Therefore, no cost rise is incurred, and besides, the machining time or the machining accuracy is not affected.

Next, other embodiments of the present invention will be described. It should be noted that component parts common to those of the first embodiment of the present invention are denoted by the same reference symbols respectively, and that the same explanation will not be repeated.

Second Embodiment

Figure 4:
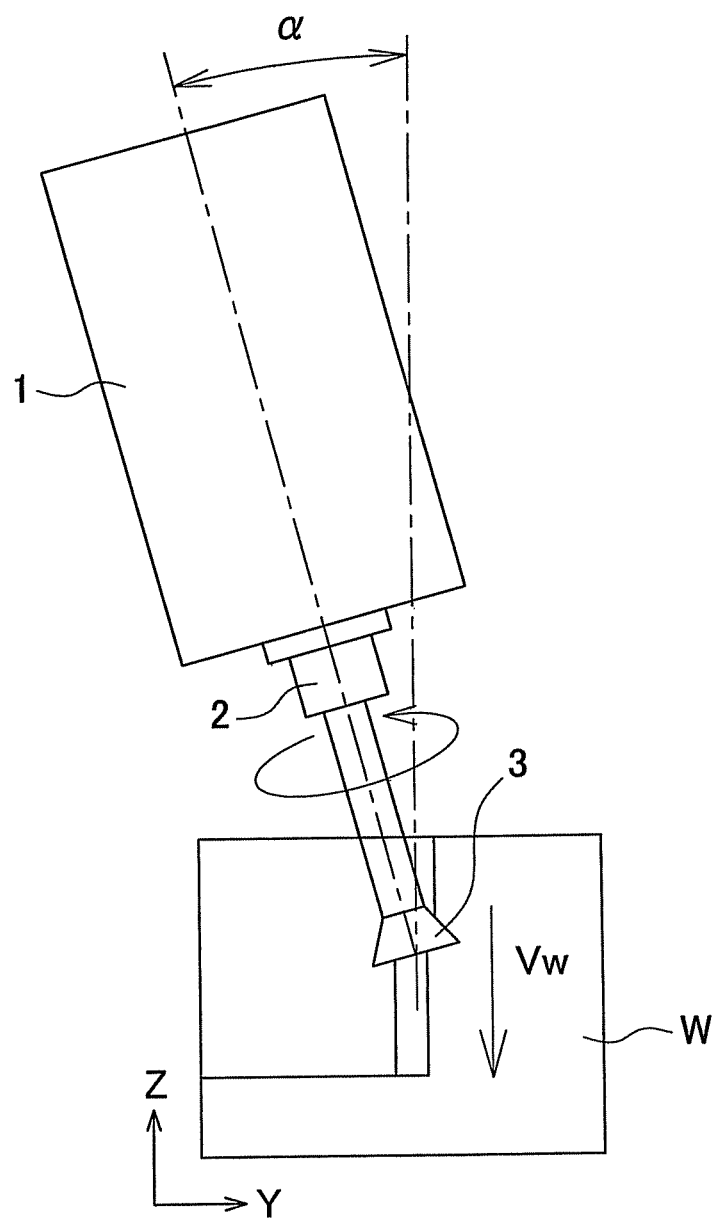
FIG. 4 is an illustrative view of a cutting method according to the second embodiment.

In this second embodiment of the present invention, as shown in FIG. 4, a rotational center axis of the rotary tool 3 is inclined at $\alpha°$ with respect to a cutting direction, namely, the Z direction.

Figure 5:
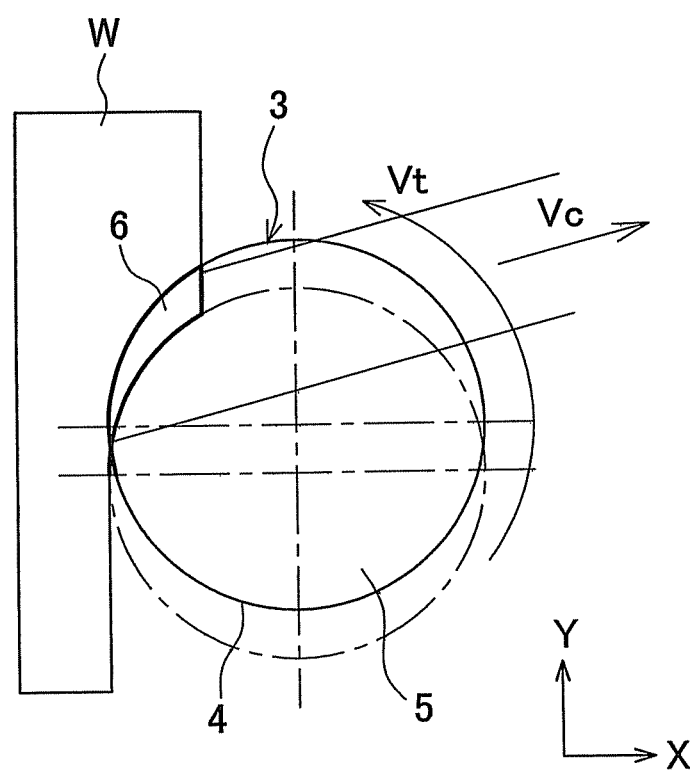
FIG. 5 is an enlarged view of a cutting region according to the second embodiment as viewed in the Z direction.

When the rotary tool 3 is thus inclined, the outflow direction of the chips 6 is changed toward the plus side in the Y direction as shown in FIG. 5. Thus, in this embodiment of the present invention, the outflow direction of the chips 6 and the rotational direction of the rotary tool 3 are set opposite to each other to perform cutting. A region in the vicinity of a point where the chips 6 separate from the cutting face 5 of the rotary tool 3 is a sphenic shape. Therefore, the rotary tool 3 is rotated oppositely to the outflow direction of the chips 6, and the cutting fluid is thereby drawn in in the sphenic manner through the curling of the chips 6. As a result, the dynamic pressure effect is likely to be achieved.

However, in this case as well, the condition for achieving the dynamic pressure effect requires that the circumferential speed of the cutting edge 4 be higher than the outflow speed of the chips 6, in addition to the setting of the rotational direction. That is, given that Vw and Vt represent the cutting speed and the circumferential speed of the cutting edge 4 respectively, the ideal outflow speed of the chips 6 is equal to Vw. Therefore, in order to achieve the dynamic pressure effect on the cutting face 5, it is appropriate to set the machining condition such that an expression shown below is satisfied.

$$Vt/Vw > 1$$

As described above, in the cutting method according to the foregoing second embodiment of the present invention, the rotary tool 3 is inclined at the predetermined angle with respect to the cutting direction, and is rotated in the rotational direction opposite to the outflow direction of the chips 6 and at the rotational speed at which the ratio Vt/Vw of the circumferential speed Vt of the cutting edge 4 to the cutting speed Vw is larger than 1, to perform cutting. Thus, the area of direct solid contact between the rotary tool 3 and the chips 6 is reduced with the aid of the dynamic pressure effect. Accordingly, the abrasion of the rotary tool 3 is suppressed, and the life of the tool is expected to be prolonged. In this case as well, the rotary tool 3 need not be formed in any special shape or moved additionally, and the dynamic pressure effect is achieved merely by setting the machining condition. Therefore, no cost rise is incurred, and besides, the machining time or the machining accuracy is not affected.

Third Embodiment

Figure 6:
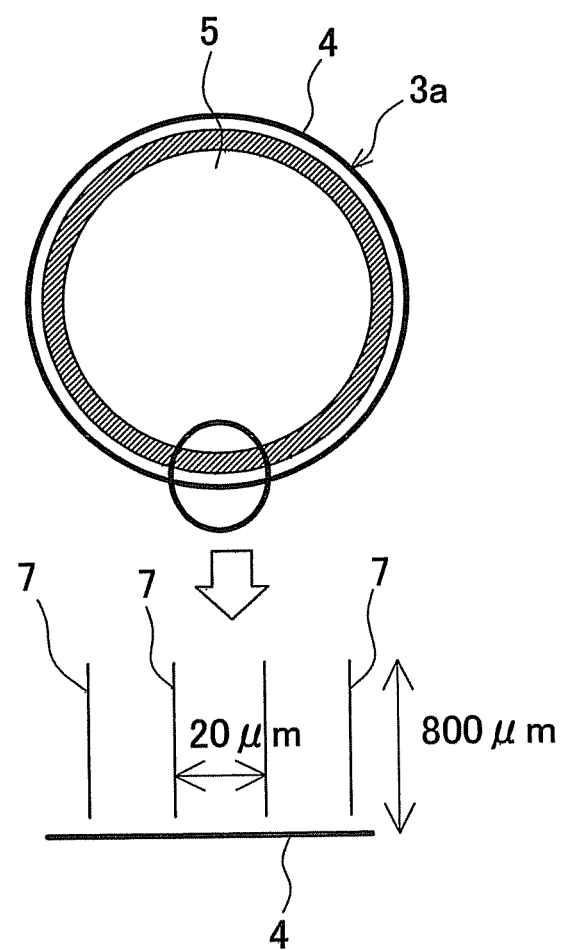
FIG. 6 is an illustrative view of a cutting tool according to the third embodiment.

In this third embodiment of the present invention as well as the second embodiment of the present invention, the rotary tool is inclined to perform cutting. In this case, however, as shown in FIG. 6, groves 7, 7, . . . 7, which are arranged at predetermined intervals in a direction intersecting with a concentric circle of the cutting edge, namely, in a radial direction, are formed on an outer peripheral side in the cutting face 5 of a rotary tool 3a along the entire circumference thereof, through laser beam machining. These grooves 7 have a width of about 3 μm, a depth of about 2 μm, and a length of about 800 μm from the cutting edge. The distance between any two adjacent ones of the grooves 7 is about 20 μm.

The rotary tool 3a having the grooves 7 thus formed in the cutting face 5 thereof is used to perform cutting. Thus, the cutting fluid is likely to be retained by the cutting face 5. As a result, the dynamic pressure effect is likely to be created between the cutting face 5 and the chips 6, and a further advantage is obtained in an attempt to prolong the life of the tool.

Figure 7:
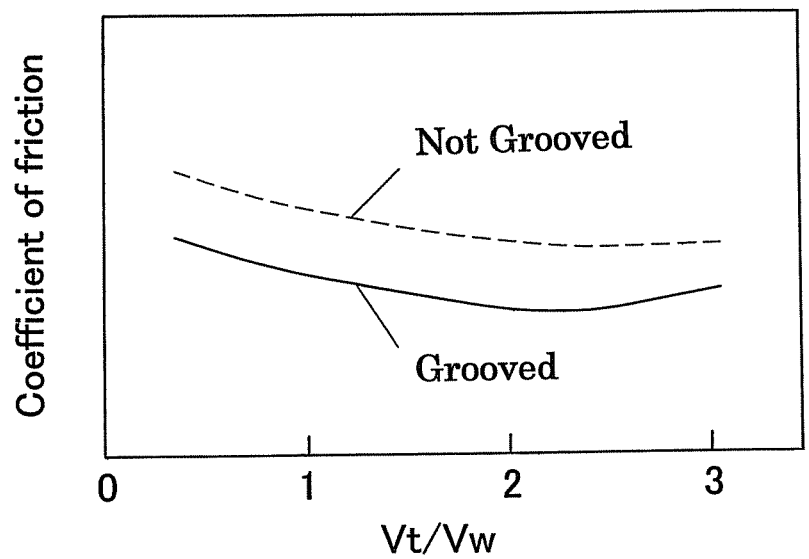
FIG. 7 is a graph showing a relationship between a speed ratio and a coefficient of friction according to the third embodiment.

FIG. 7 is a graph showing a relationship between the speed ratio Vt/Vw of the circumferential speed Vt of the cutting edge 4 to the cutting speed Vw and the coefficient of friction on the cutting face 5. This graph shows a result obtained by rotating the work W at the circumferential speed Vw at a machining point and rotating the rotary tool 3a with the grooves 7 shown in FIG. 6 and the rotary tool 3 with no grooves 7 oppositely to the outflow direction of the chips 6 at the circumferential speed Vt in the inclined state shown in FIG. 4 while supplying the cutting fluid thereto through minimum quantity lubrication so as to perform cutting respectively.

As is apparent from this graph, the grooved rotary tool indicated by a solid line has a lower coefficient of friction than the non-grooved rotary tool indicated by dotted lines. It is revealed that the dynamic pressure effect is enhanced through the formation of the grooves.

Further, in this cutting experiment, there is a tendency for the thickness of the chips to decrease due to a fall in the coefficient of friction as the speed ratio Vt/Vw increases. However, in the grooved rotary tool, the coefficient of friction starts increasing slightly almost as soon as the speed ratio exceeds 2. This tendency is similar to that observed during a transition from a mixed lubrication state to a fluid lubrication state.

It should be noted that the coefficient of friction in the case where cutting is performed by the non-grooved rotary tool without supplying the cutting fluid thereto is two, three or more times as high as the coefficient of friction in the case where cutting is performed by the grooved rotary tool while supplying the cutting fluid thereto. Therefore, according to the cutting performed by the rotary tool of this third embodiment of the present invention, it is obvious that an unprecedentedly low coefficient of friction is realized.

As described above, in the cutting method according to the foregoing third embodiment as well, the area of direct solid contact between the rotary tool 3a and the chips 6 is reduced with the aid of the dynamic pressure effect, and the life of the tool is expected to be prolonged owing to the suppression of abrasion. Especially in this case, since the plurality of radial grooves 7 are formed in the cutting face 5, a more favorable dynamic pressure effect is achieved to effectively prolong the life of the tool. Although the grooves 7 need to be formed in the rotary tool 3a when compared with the first or second embodiment of the present invention, the grooves 7 can be easily formed and no substantial cost rise is incurred. Further, the machining time or the machining accuracy is not affected by these grooves.

It should be noted that the specification of the grooves is not limited to the values mentioned in the foregoing third embodiment of the present invention, but can be appropriately changed in accordance with the diameter of the rotary tool or the like. Further, the direction in which the grooves are formed is not limited to the radial direction either. That is, the grooves may be formed at any other angle as long as the direction in which the grooves are formed intersects with the concentric circle of the cutting edge. Furthermore, the grooves may also be formed through grinding, coating, mold casting, or the like. The method of forming the grooves is not limited to laser beam machining as mentioned in the foregoing embodiment of the present invention.

As a matter of course, the present invention is not limited to plunge milling by the machining center. For example, the present invention is also applicable to a case where a cylindrical work is turned using a lathe or a compound machine as mentioned in Japanese Patent Application Publication No. 2007-152480 or Published Japanese Translation of PCT Application No. 2007-504011.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A cutting method for cutting a work comprising:
rotating a rotary tool with a single circular cutting edge around an axis thereof while supplying a cutting fluid thereto,
performing cutting by moving the rotary tool in a direction of the axis of the rotary tool with the rotary tool rotating in a first rotational direction around the axis of the rotary tool and at a rotational speed at which a circumferential speed of the cutting edge is higher than an outflow speed of the chips, wherein the circumferential speed of the cutting edge being higher than the outflow speed of the chips generates a dynamic pressure effect that draws the cutting fluid into a frictional portion thereby providing a film of the cutting fluid between the rotary tool and the chips to prevent solid contact and suppress abrasion of the rotary tool during cutting, and wherein the first rotational direction of the rotary tool is an outflow direction of chips, and
wherein the rotary tool has a cutting face in which a plurality of grooves are arranged in a direction intersecting with the single circular cutting edge, and the plurality of grooves do not extend to a peripheral line of the cutting edge whereby a coefficient of friction of the rotary tool is lowered.

2. A cutting method for cutting a work comprising:
rotating a rotary tool with a single circular cutting edge around an axis thereof while supplying a cutting fluid thereto,
performing cutting by moving the rotary tool in a direction of the axis of the rotary tool with the rotary tool inclined at a predetermined angle with respect to a cutting direction and rotating in a first rotational direction around the axis and at a rotational speed at which a ratio Vt/Vw is larger than 1, a cutting speed is represented by Vw and a circumferential speed of the cutting edge is represented by Vt, wherein the cutting speed Vw is directly related to an outflow speed of the chips by $Vc=Vw \times t1/t2$, where Vc is the outflow speed of the chips, t1 is the cut amount and t2 is a chip thickness, and the circumferential speed of the cutting edge Vw being higher than an outflow speed of the chips Vc generates a dynamic pressure effect that draws the cutting fluid into a frictional portion thereby providing film of the cutting fluid between the rotary tool and the chips to prevent solid contact and suppress abrasion of the rotary tool during cutting, and wherein the first rotational direction of the rotary tool is opposite to an outflow direction of chips, and
wherein the rotary tool has a cutting face in which a plurality of grooves are arranged in a direction intersecting with the single circular cutting edge, and the plurality of grooves do not extend to a peripheral line of the cutting edge whereby a coefficient of friction of the rotary tool is lowered.

* * * * *